(12) United States Patent
Ogawa

(10) Patent No.: US 6,937,542 B1
(45) Date of Patent: Aug. 30, 2005

(54) RECORDING DEVICE AND METHOD OF DETECTING TRACKING ERROR SIGNAL AND WOBBLE SIGNAL OF A WOBBLED TRACK OF AN OPTICAL DISK

(75) Inventor: Atsushi Ogawa, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/507,269

(22) Filed: Feb. 18, 2000

(30) Foreign Application Priority Data

Feb. 22, 1999 (JP) .......................................... 11-043815

(51) Int. Cl.[7] .................................................. G11B 7/00
(52) U.S. Cl. ................................ 369/44.13; 369/44.41; 369/53.22; 369/59.12
(58) Field of Search ........................... 369/44.11, 44.13, 369/44.14, 44.41, 53.22, 59.12

(56) References Cited

U.S. PATENT DOCUMENTS

| | | | | |
|---|---|---|---|---|
| 4,707,816 A | * | 11/1987 | Yonezawa et al. ............. 369/44 |
| 4,847,822 A | * | 7/1989 | Takasugi et al. .............. 369/43 |
| 4,866,688 A | * | 9/1989 | Ohtake et al. ................. 369/44 |
| 5,150,345 A | * | 9/1992 | Shikichi et al. ........... 369/44.34 |
| 5,396,477 A | * | 3/1995 | Matsumoto et al. ...... 369/44.28 |
| 5,404,345 A | * | 4/1995 | Taki .......................... 369/44.26 |
| 5,490,127 A | * | 2/1996 | Ohta et al. ................... 367/116 |
| 5,636,197 A | * | 6/1997 | Tateshi ........................ 369/124 |
| 5,930,211 A | * | 7/1999 | Sasaki ..................... 369/44.29 |
| 5,959,802 A | * | 9/1999 | Sato ......................... 360/77.14 |
| 6,298,024 B1 | * | 10/2001 | Nomura .................... 369/53.22 |
| 6,560,172 B1 | * | 5/2003 | Nakajo ..................... 369/44.13 |

* cited by examiner

*Primary Examiner*—Gautam R. Patel
(74) *Attorney, Agent, or Firm*—Pillsbury Winthrop Shaw Pittman LLP

(57) ABSTRACT

In an optical disk recording device for projecting a recording light beam onto an optical disk to form 3T–11T pits in a land of the optical disk, timing to sample and hold a reflected light detection signal for tracking servo control is delayed behind timing to sample and hold the reflected light detection signal for wobble signal detection. Further, a sample-and-hold time period of the reflected light detection signal for tracking servo control is set to be shorter than a sample-and-hold time period of the reflected light detection signal for wobble signal detection. Such arrangements permit appropriate recording, even at high recording speeds, irrespective of residual optical axis deviations.

4 Claims, 6 Drawing Sheets

RECORDING DEVICE AND METHOD OF DETECTING TRACKING ERROR SIGNAL AND WOBBLE SIGNAL OF A WOBBLED TRACK OF AN OPTICAL DISK

BACKGROUND OF THE INVENTION

The present invention relates generally to optical disk recording methods and devices for recording desired information onto optical disks, such as CD-R, CD-RW, CD-WO, MD and DVD types, using light power, and more particularly to tracking servo control and wobble signal detection during recording.

Conventionally, in the pitch-forming tracks of write-once optical disks such as CD-R, CD-RW, CD-WO, MD and DVD types, there are formed grooves called "pregrooves", which have pre-recorded therein absolute time information also known as ATIP (Absolute Time In-Pregoove). Specifically, the ATIP information is embedded in the optical disk by wobbling the track grooves, and necessary recording/reproduction control is performed on the basis of the ATIP information that is obtained by reproducing signals representative of the track wobbles (hereinafter called "wobble signals").

Tracking error and wobble signals are generally detected by processing outputs from a position-detecting photodetector incorporated in an optical pickup. Specifically, as illustratively shown in FIG. 7, the position-detecting photodetector of the optical pickup comprises a four-quadrant or four-part photodiode 101 which is so named because it has a set of four light receiving surfaces A, B, C and D. Two combinations of the surfaces (A+D) and (B+C) form two composite light receiving surfaces that are segmented in the radial direction of the optical disk along a demarcation line extending along the tracks, and other two combinations of the surfaces (A+B) and (C+D) form other two composite light receiving surfaces that are segmented in the radial direction of the optical disk along another demarcation line extending in a direction transverse to the tracks. Reflected light detection signals, produced by the light receiving surfaces A, B, C and D receiving a light beam reflected from the optical disk, are sampled and held by respective sample-and-hold circuits 102a, 102b, 102c and 102d. The reflected light detection signals, output from the light receiving surfaces A and D and then sampled and held by the sample-and-hold circuits 102a and 102d are added together by an adder 103, while the reflected light detection signals, output from the light receiving surfaces B and C and then sampled and held by the sample-and-hold circuits 102b and 102c, are added together by another adder 104. Then, a subtracter 105 calculates a difference between the sums from the adders 103 and 104, i.e., "(A+D)−(B+C)". EFM (Eight to Fourteen Modulation) signals modulated on the basis of presence/absence of pits in the optical disk are each detected in the same phase by the light receiving surfaces A, B, C and D. But, the (A+D) and (B+C) signals are detected in opposite phases by the two composite light receiving surfaces that are located opposite to each other in the radial direction of the beam spot on a land of the optical disk, so that they can be used as the tracking error (TE) signal or used for detection of the wobble signal.

Generally, the optical axes of optical pickups employed in this type of optical recording device are factory-adjusted after manufacture of their associated disk drives; however, because the optical axes are not necessarily correctable to an ideal complete condition, the optical axis adjustment is usually judged to be acceptable as long as they fall within a permissible range (manufacturing tolerance) predetermined for the disk drives. Further, in the manufacture verifications, it is desirable that all the optical pickups be judged to be acceptable after having undergone all possible tests based on all possible data. In practice, however, only minimum necessary verifications are carried out on the basis of so-far accumulated performance records and statistical and technical evidences, in order to meet market demands for prompter shipment and lower price. Thus, as the factory adjustment for verifying the manufacturing accuracy of the optical axes, it has been conventional to actually record data onto disk media by means of the manufactured disk drive and then read out the thus-recorded data from the disk media using the same disk drive to thereby verify the reproduced signal quality. The reproduced signal quality is normally determined by measuring jitters in the reproduced signal and then ascertaining whether the measured jitters are within a permissible range.

What is to be noted here is that the measured jitter values are relative values indicative of variations in the length of recorded pits and optical axis deviations can not be completely corrected by any means possible, i.e., would be left unremoved under any circumstances. FIG. 8 is a diagram showing a typical relationship between the light receiving surfaces of the four-quadrant photodetector and a reflection of the light beam spot received by the photodetector, to explain the optical axis deviations or offset from the center of the photodetector. Assuming that the reflection of the light beam spot has a uniform light intensity throughout its circular region, there would occur a tracking error (TE) signal with an intensity proportional to a total area of the received light on the four-quadrant photodetector. If the radius of the received light beam spot is given as "r" and the deviations, in x and y directions, of the center of the beam spot off the center of the four-quadrant photodetector are given as "a" and "b", respectively, the respective areas SA, SB, SC and SD of the received light beam on the four light receiving surfaces can be expressed as follows:

$$SA = (1/4)\pi r^2 - ar + b(r-a)$$

$$SB = (1/4)\pi r^2 + (a+b)r + ab$$

$$SC = (1/4)\pi r^2 - br + a(r-b)$$

$$SD = (1/4)\pi r^2 - (a+b)r + ab \qquad \text{Equation 1}$$

Therefore, the tracking error (TE) signal can be expressed as $$TE \propto (SA+SD) - (SB+SC) \propto 4ar \qquad \text{Equation 2}$$

Namely, this means that a tracking offset or error, as represented by "4ar" of Equation 2, is left unremoved. If recording is performed with a large tracking offset, the reproduced signals will present bad jitter measures. Because of this, optimum jitter measures can be said to represent an optimum recording condition. However, in a situation where the recording is performed with a slight stabilized tracking error, the pits may be formed to relatively uniform lengths and shapes and thus there is a sufficient likelihood that the signals reproduced from the optical disk will present optimum jitter measures.

Further, in order to meet the market demands for prompter shipment and lower price, the factory adjustment may be performed to correct the angle of a disk-rotating motor shaft in such a manner that reproduced signals obtained by reproducing, at a normal speed, data recorded on the optical disk at the normal speed can present jitter values falling within the permissible range. In such a case, the optical axis offset can not necessarily be removed completely (i.e., to a zero value) although the optical disk drive can shipped after having been corrected to a best jitter mode. Although such a verifying approach has not presented significant problems in optical disk recording at not-so-high speeds such as a four-times recording speed, it has been found that the residual optical axis deviations are not negligible either.

Japanese Patent Application Laid-open No. HEI-8-235617 discloses a method, in accordance with which a light-transmitting flat plate is pivotally positioned in the optical path and the optical axis offset is corrected by adjusting the angle of the flat plate. However, the light-transmitting flat plate can not be incorporated in the movable optical pickup and therefore has to be provided separately from the optical pickup, so that the optical path becomes considerably long. Thus, the disclosed method would require higher adjustment accuracy, such as accurate collimation of the laser light beam and accurate optical axis angle, which involves an increased number of component parts and hence an increase in costs. In addition, readjustment would also become necessary due to deviations over time.

SUMMARY OF THE INVENTION

It is therefore an object of the present invention to provide an optical disk recording method and device which, while maintaining the advantages of the conventionally-known optical disk recording techniques, permit appropriate recording, even at high recording speeds, irrespective of residual optical axis deviations and without a need for an increased number of component parts.

According to one aspect of the present invention, there is provided an optical disk recording method which comprises: the steps of: projecting a recording light beam onto an optical disk to form pits of predetermined lengths in a land of the optical disk; receiving reflected light of the recording light beam from pit-formed and non-pit-formed portions of the optical disk, during recording, by means of a photodetector having a plurality of light receiving surfaces segmented along a radial direction of the optical disk, to thereby output a composite reflected light detection signal; sampling and holding the reflected light detection signal; and performing tracking servo control and detection of a wobble signal on the basis of a light amount distribution, in the radial direction of the optical disk, of the reflected light detection signal sampled and held by the step of sampling and holding, wherein timing for the step of sampling and holding to sample and hold the reflected light detection signal for the tracking servo control is delayed behind timing for the step of sampling and holding to sample and hold the reflected light detection signal for the detection of the wobble signal, and wherein a sample-and-hold time period of the reflected light detection signal for the tracking servo control is set to be shorter than a sample-and-hold time period of the reflected light detection signal for the detection of the wobble signal.

The present invention also provides an optical disk recording method which comprises the steps of: projecting a recording light beam onto an optical disk to form pits of predetermined lengths in a land of the optical disk; receiving reflected light of the recording light beam from pit-formed and non-pit-formed portions of the optical disk, during recording, by means of a photodetector having a plurality of light receiving surfaces segmented along a radial direction of the optical disk, to thereby output a composite reflected light detection signal; sampling and holding the reflected light detection signal; and performing tracking servo control and detection of a wobble signal on the basis of a light amount distribution, in the radial direction of the optical disk, of the reflected light detection signal sampled and held by the step of sampling and holding, wherein the tracking servo control is performed on the basis of a value of the reflected light detection signal sampled and held by the step of sampling and holding, and the detection of the wobble signal is performed on the basis of the reflected light detection signal before being sampled and held by the step of sampling and holding.

According to another aspect of the present invention, there is provided an optical disk recording device which comprises: an optical pickup for projecting a recording light beam onto an optical disk to form pits of lengths in a 3T–11T range (1T represents a unit time length, in the longitudinal direction of a track, which corresponds to a clock period), and receiving reflected light of the recording light beam from the optical disk by means of a photodetector having a plurality of light receiving surfaces segmented along a radial direction of the optical disk to thereby output a composite reflected light detection signal; a sampling pulse generation circuit for delaying the reflected light detection signal to generate a first sampling pulse and a second sampling pulse having a greater delay time than the first sampling pulse; a first sample-and-hold circuit for, in accordance with the first sampling pulse, sampling and holding the reflected light detection signal output from the optical pickup; a tracking error detection circuit for generating a tracking error signal on the basis of a light amount distribution, in the radial direction of the optical disk, of the reflected light detection signal sampled and held by the first sample-and-hold circuit; a servo control circuit for performing tracking servo control on the optical pickup in accordance with the tracking error signal generated by the tracking error detection circuit; a second sample-and-hold circuit for, in accordance with the second sampling pulse, sampling and holding the reflected light detection signal output from the optical pickup; and a wobble detection circuit for detecting a wobble signal on the basis of a light amount distribution, in the radial direction of the optical disk, of the reflected light detection signal sampled and held by the second sample-and-hold circuit.

The present invention also provides an optical disk recording device which comprises: an optical pickup for projecting a recording light beam onto an optical disk to form pits of lengths in a 3T–11T range and receiving reflected light of the recording light beam from the optical disk by means of a photodetector having a plurality of light receiving surfaces segmented along a radial direction of the optical disk to thereby output a composite reflected light detection signal; a sampling pulse generation circuit for delaying the reflected light detection signal to generate a sampling pulse; a sample-and-hold circuit for, in accordance with the sampling pulse, sampling and holding the reflected light detection signal output from the optical pickup; a tracking error detection circuit for generating a tracking error signal on the basis of a light amount distribution, in the radial direction of the optical disk, of the reflected light detection signal sampled and held by the sample-and-hold circuit; a servo control circuit for performing tracking servo control on the optical pickup in accordance with the tracking error signal generated by the tracking error detection circuit; and a wobble detection circuit for detecting a wobble signal on the basis of a light amount distribution, in the radial direction of the optical disk, of the reflected light detection signal output from the optical pickup.

When the light beam is irradiated or projected onto a dye-layer-type optical disk, reflectivity of the optical disk presents a high level at the beginning of the beam projection because no pit has been formed yet in the optical disk, but gradually decreases as more and more pits are formed in the optical disk so that the level of the reflected light detection (reflection reception) signal also decreases gradually to then become stable. Unbalanced light amount distribution, in the radial direction of the optical disk, on the four-quadrant photodetector which results from the optical axis offset exerts greater influences when the reflection, i.e., reflected light detection signal, is at high levels. Thus, if the delay time from the rising edge of a recording signal to a start of sampling is short, like that of the sampling pulse for tracking servo control, then a portion of the reflected light detection signal will be sampled which has greater influences of the unbalanced light amount distribution on the four-quadrant photodetector. Therefore, according to the present invention, the delay time from the rising edge of the recording signal to the start of sampling is extended, like that of the sampling pulse for wobble signal detection, so that the sampling is started with a portion of the reflected light detection signal having less influences of the unbalanced light amount, to thereby shorten the sample-and-hold time as a whole. However, it has been found that the thus-shortened sample-and-hold time would deteriorate the carrier-to-noise (C/N) ratio of the wobble signals during recording. To eliminate this inconvenience, the present invention is characterized in that the sampling pulse for wobble detection, whose sample-and-hold period is longer than that of the sampling pulse for tracking servo control, is generated separately from the sampling pulse for tracking servo control, or the wobble signal is detected from the "through" (non-sampled) reflected light detection. With such characteristic arrangements, the present invention can effectively prevent the sample-and-hold operation for the tracking servo control from adversely influencing the wobble signal detection. Further, because the present invention is based on control to only differentiate the delay time between the tracking servo control and the wobble detection or to not perform sampling for the wobble detection, the necessary control circuitry can be greatly simplified in structure.

Further, experiments conducted by the present inventor have shown that in generating the first sampling pulse for tracking servo control and the second sampling pulse for wobble detection under a condition where lengths, along the longitudinal direction of the track, of pits formed in the land of the optical disk are set to, for example, a 3T–11T range (1T represents a unit time length, in the longitudinal direction of the track, which corresponds to a clock period), it is desirable that the delay time of the timing to sample and hold the reflected light detection signal for the servo control be set to be within a 4T–5T range while the delay time of the timing to sample and hold the reflected light detection signal for the wobble signal is set to be within a 0–2T range.

Furthermore, the delay time of the timing to sample and hold the reflected light detection signal for the servo control is varied on the basis of at least one of a particular type of the optical disk employed and a recording speed used for the optical disk. In this way, optimum version-upgrade of the optical recording device is permitted, at any desired time, even for various different types of optical disks employed.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
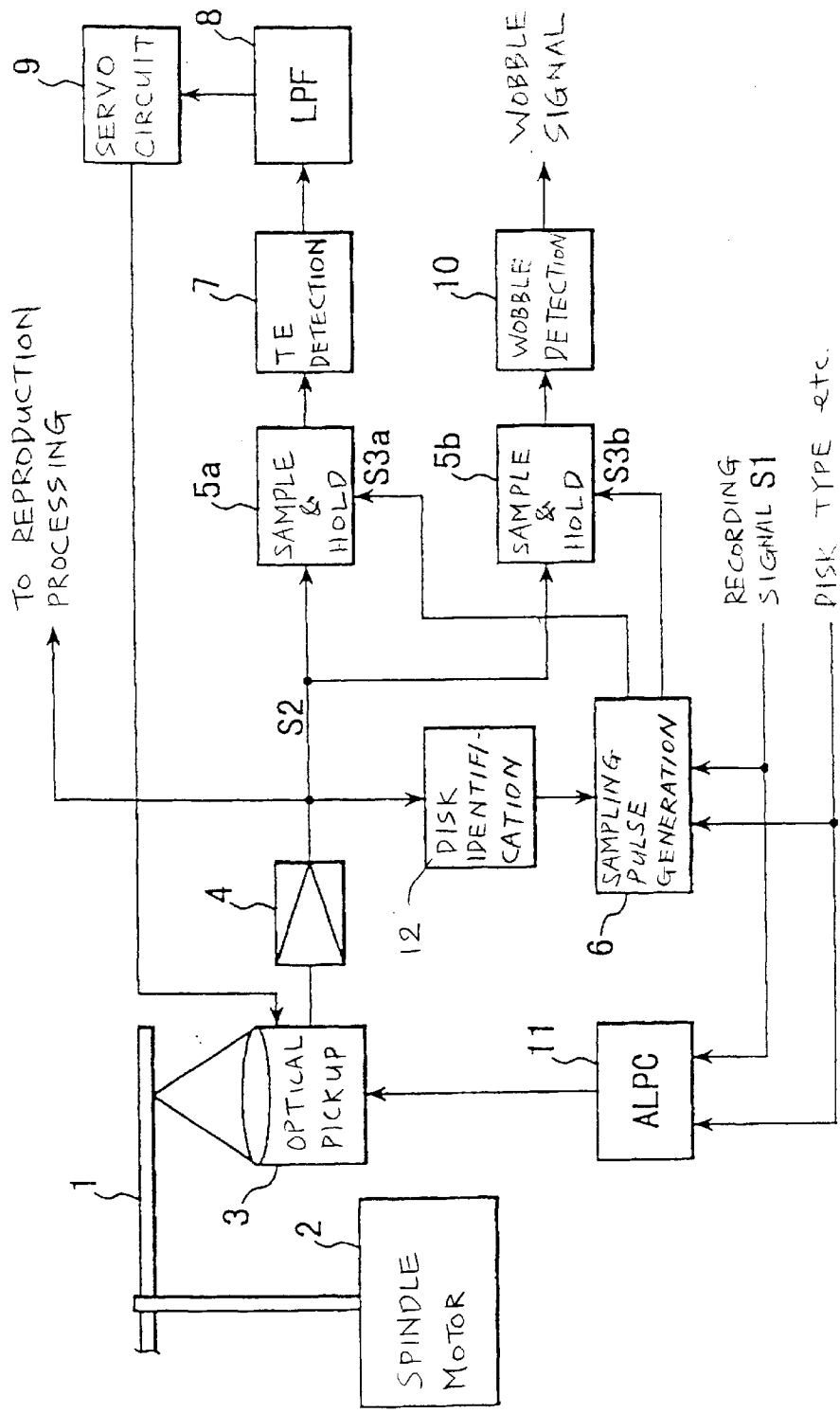
FIG. 1 is a block diagram showing a general organization of an optical disk recording device in accordance with a first preferred embodiment of the present invention.

FIG. 1 is a block diagram showing an organization of principal components of an optical disk recording device in accordance with a first preferred embodiment of the present invention.

Optical disk 1 shown in FIG. 1 is of a CD-WO (Compact Disc-Write Once) type disk where a dye layer, of cyanine dye, phthalocyanine dye or diazo dye, is formed on a transparent polycarbonate substrate having lands and grooves preformed at intervals of, say, 1.6 $\mu$m. This optical disk 1 is driven via a spindle motor 2 to rotate at a constant linear velocity. Optical pickup 3 is provided in opposed relation to the recording surface of the optical disk 1. The optical pickup 3 is controllably driven to move in the radial direction of the optical disk 1 by a feed motor (not shown).

Laser diode is incorporated in the optical pickup 3, and a recording laser light beam output from the laser diode is irradiated or projected onto a land of the optical disk 1. Reflection of the thus-projected recording laser light beam from the optical disk 1 is received by a four-quadrant photodetector of the optical pickup 3 and then output from the optical pickup 3 as a composite reflected light detection signal S2 composed of signal components from the four quadrants. The reflected light detection signal S2 from the optical pickup 3 is amplified by a high-frequency (HF) amplifier 4 and then passed to sample-and-hold circuits 5a and 5b, which sample and hold the reflected light detection signal S2 for a predetermined time period in response to sampling pulses S3a and S3b, respectively, that are fed from a sampling pulse generator circuit 6 as will be later described in detail. Output from the sample-and-hold circuit 5a is detected as a tracking error (TE) signal by means of a tracking error detection section 7, and then delivered to a servo control section 9 after being filtered via a low-pass filter 8. The servo control section 9 performs tracking servo control on the optical pickup 3 in accordance with the tracking error (TE) signal. Output from the sample-and-hold circuit 5b, on the other hand, is sent to a wobble detection circuit 10, which detects a wobble signal from the output from the sample-and-hold circuit 5b. The wobble signal thus detected by the wobble detection circuit 10 is then subjected to processing by a not-shown signal processing system to acquire ATIP information as necessary.

Recording signal S1 output from a recording signal generation circuit (also not shown) is supplied to an automatic laser power control (ALPC) circuit 11, which controls a laser power level for recording the recording signal S1 onto the optical disk 1.

In order to set optimal timing (positions) for generating the sampling pulses S3a and S3b and widths of the sampling pulses S3a and S3b depending on a particular type of the optical disk 1, the preferred embodiment is arranged in such a manner that a recording speed increase ratio used for the optical disk 1 and the particular type of the disk 1, such as a material forming the optical disk 1, is identified by a disk identification section 12 on the basis of disk ID information recorded on the disk 1 and the generating positions and widths of the sampling pulses S3a and S3b are fixed on the basis of the identification results. The generating positions and widths of the sampling pulses S3a and S3b as well as the laser power level for recording the recording signal S1 are also controlled on the basis of disk type information etc. separately supplied from the outside.

Figure 2:
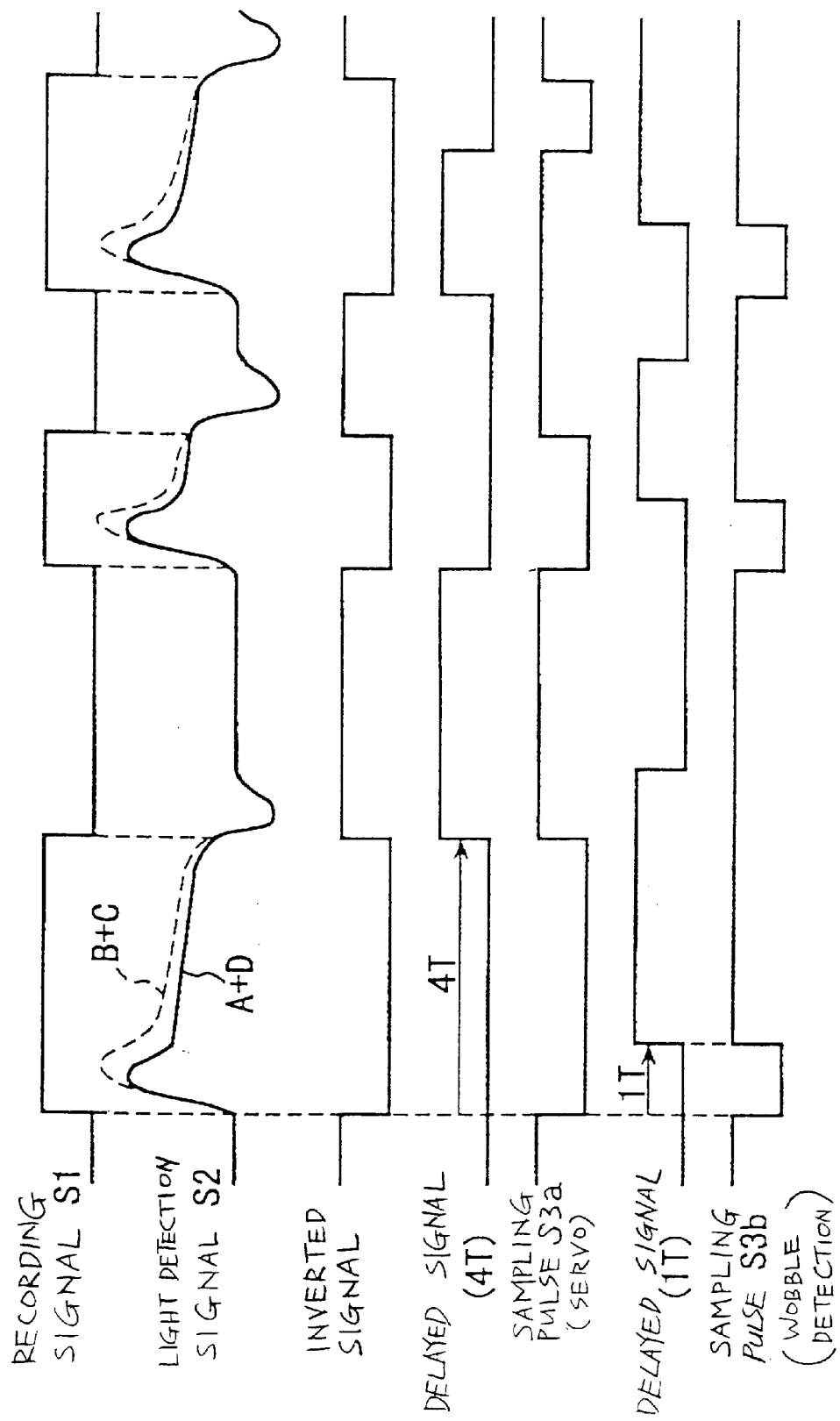
FIG. 2 is a waveform diagram showing a recording signal to be recorded onto the optical disk and various other signals used to sample a composite reflected light detection signal in the embodiment of FIG. 1.

FIG. 2 is a waveform diagram showing the recording signal S1 to be recorded onto the optical disk 1 and various other signals used to sample the reflected light detection signal S2.

As noted earlier, the reflected light detection signal S2 is generated by receiving the light reflected from the optical disk 1 as the optical pickup 3 projects the recording laser light beam onto the disk 1 to form pits in the disk's land on the basis of the recording signal S1. This signal S2 presents reflection power levels which are greatest at a point immediately following a start of the recording and then decrease gradually. The sampling pulse generator circuit 6 generates the sampling pulse S3a by ANDing a signal obtained by inverting the recording signal S1 and a signal obtained by delaying the recording signal S1 by, for example, 4T (1T represents a unit time length, corresponding to one clock period, along a longitudinal direction of the track, which corresponds to a clock period). The thus-generated sampling pulse S3a is sent to the sample-and-hold circuit 5a. In this way, the sample-and-hold circuit 5a, as shown in FIG. 2, can sample and hold a portion of the reflected light detection signal S2 from the four-quadrant photodetector which is defined by rising and falling edges of the sampling pulse S3a and has less influences of an unbalanced light amount distribution in the radial direction of the optical disk.

Further, the sampling pulse generator circuit 6 generates the sampling pulse S3b by ANDing the signal obtained by inverting the recording signal S1 and a signal obtained by delaying the recording signal S1 by, for example, 1T. The thus-generated sampling pulse S3b is sent to the sample-and-hold circuit 5b. In this way, the sample-and-hold circuit 5b, as shown in FIG. 2, can sample and hold a relatively wide portion of the reflected light detection signal S2 other than its peak portion alone.

Figure 3:
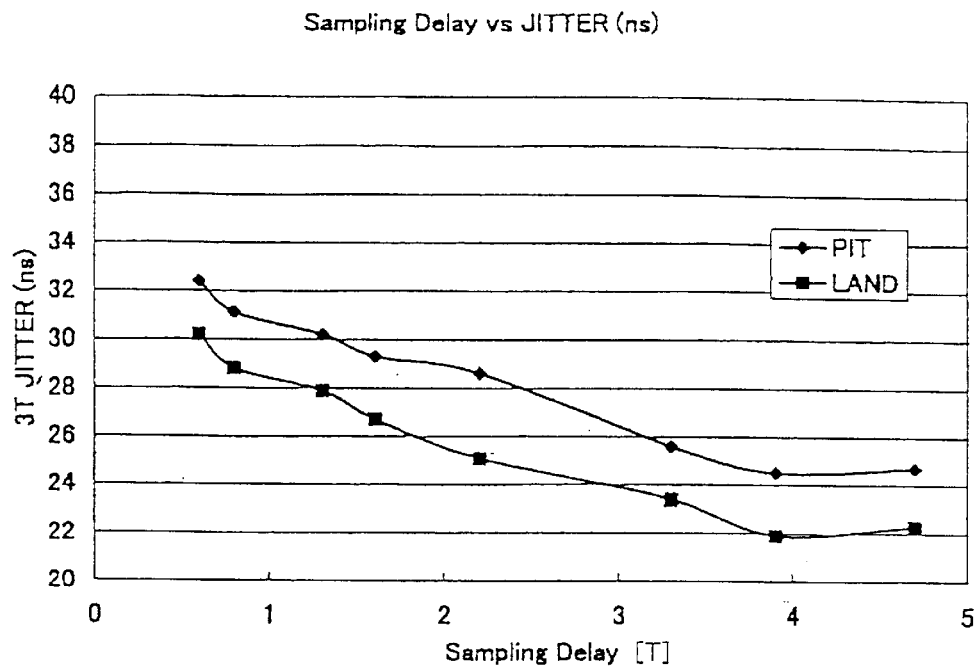
FIG. 3 is a graph showing relationship between a delay time of a sampling pulse for tracking servo control and jitters of a recording signal.
Figure 4:
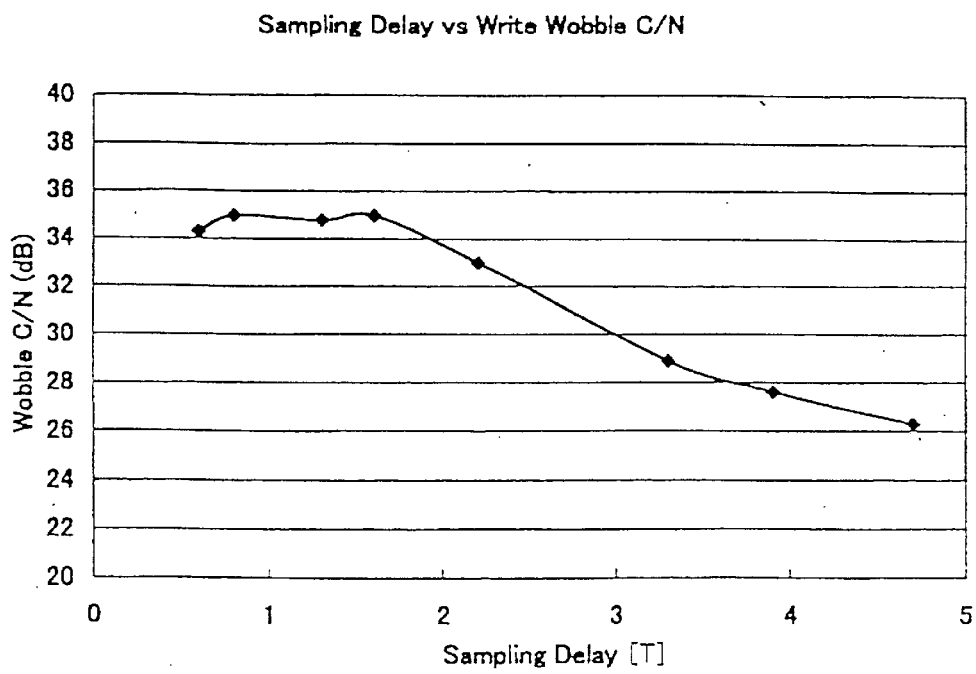
FIG. 4 is a graph showing relationship between a delay time of a sampling pulse for wobble detection and a C/N ratio of a wobble signal.

FIG. 3 is a graph showing relationship between the delay time of the sampling pulse for tracking servo control and jitters of the recording signal, and FIG. 4 is a graph showing relationship between the delay time of the sampling pulse for wobble detection and the carrier-to-noise (C/N) ratio of the wobble signal. From the graph of FIG. 3, it is seen that the jitters decrease as the delay time is made longer and the least jitters occur when the delay time is set to be within the range of 4T–5T. The graph of FIG. 4 shows that the carrier-to-noise (C/N) ratio of the wobble signal, on the other hand, decreases as the delay time is made longer and the delay time within the range of 0–2T is optimum. As may be clear from these, the optimum value of the sampling pulse delay time for the servo control and the optimum value of the sampling pulse delay time for the wobble signal detection are in antinomic relation to each other.

Figure 5:
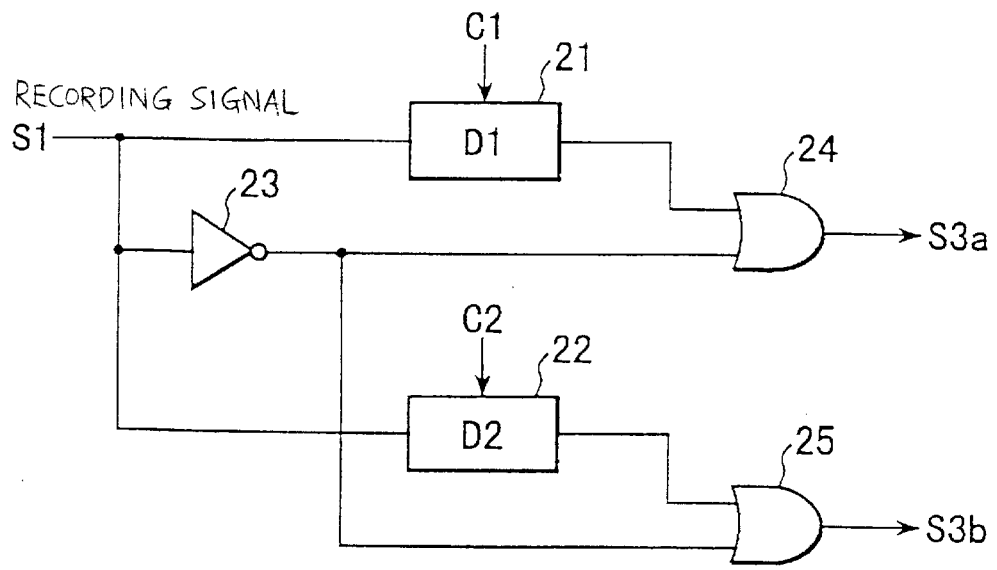
FIG. 5 is a block diagram of a sampling pulse generating circuit in the optical disk recording device of FIG. 1.
Figure 7:
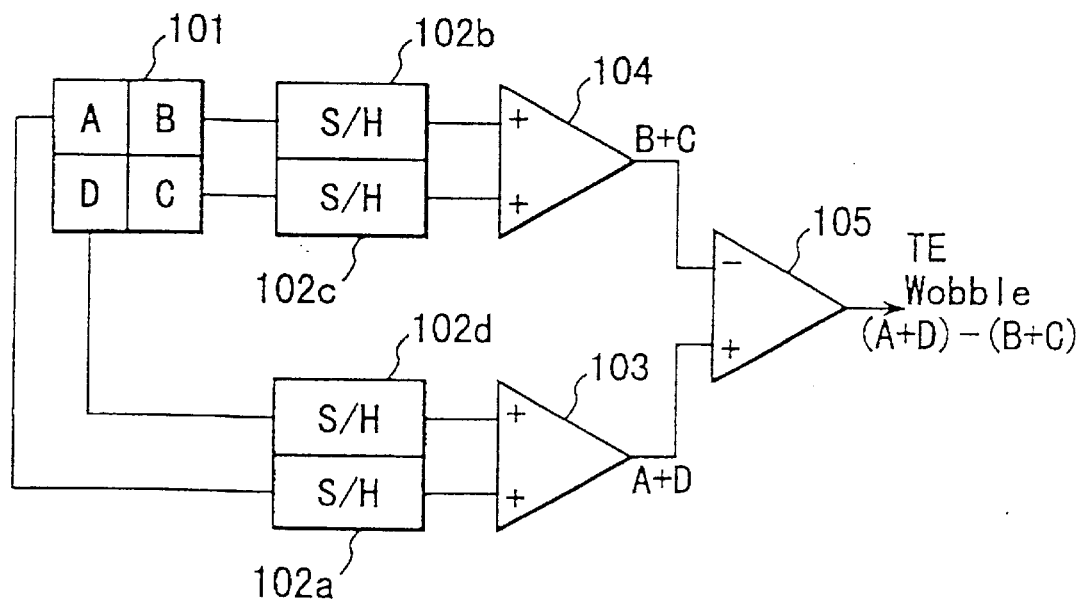
FIG. 7 is a block diagram of conventional circuitry for detecting a tracking error and wobble signal.

In the first preferred embodiment described in relation to FIG. 1, the sampling timing for the tracking servo control and the sampling timing for the wobble signal detection are set to optimum values independently of each other. To generate such two different sampling pulses, the sampling pulse generator circuit 6 may be constructed in a manner as illustratively shown in FIG. 5. The recording signal S1 is sent to and delayed via two delay circuits 21 and 22 that can set the respective delay times, independently of each other, in accordance with control signals C1 and C2. The recording signal S1 is also sent to an inverter 23 for inversion. The resultant inverted recording signal S1 is passed to a gate circuit 24, which ANDs the inverted recording signal S1 and the output from the delay circuit 21 to thereby generate the sampling pulse S3a. The inverted recording signal S1 is also passed to another gate circuit 25, which ANDs the inverted recording signal S1 and the output from the delay circuit 22 to thereby generate the sampling pulse S3b. The above-mentioned control signals C1 and C2 are set to appropriate values that may be given from a ROM table (not shown) or the like in accordance with the type, recording speed, recording density, etc. of the optical disk 1. In this way, the sampling pulse generator circuit 6 can be extremely simplified in structure.

Figure 6:
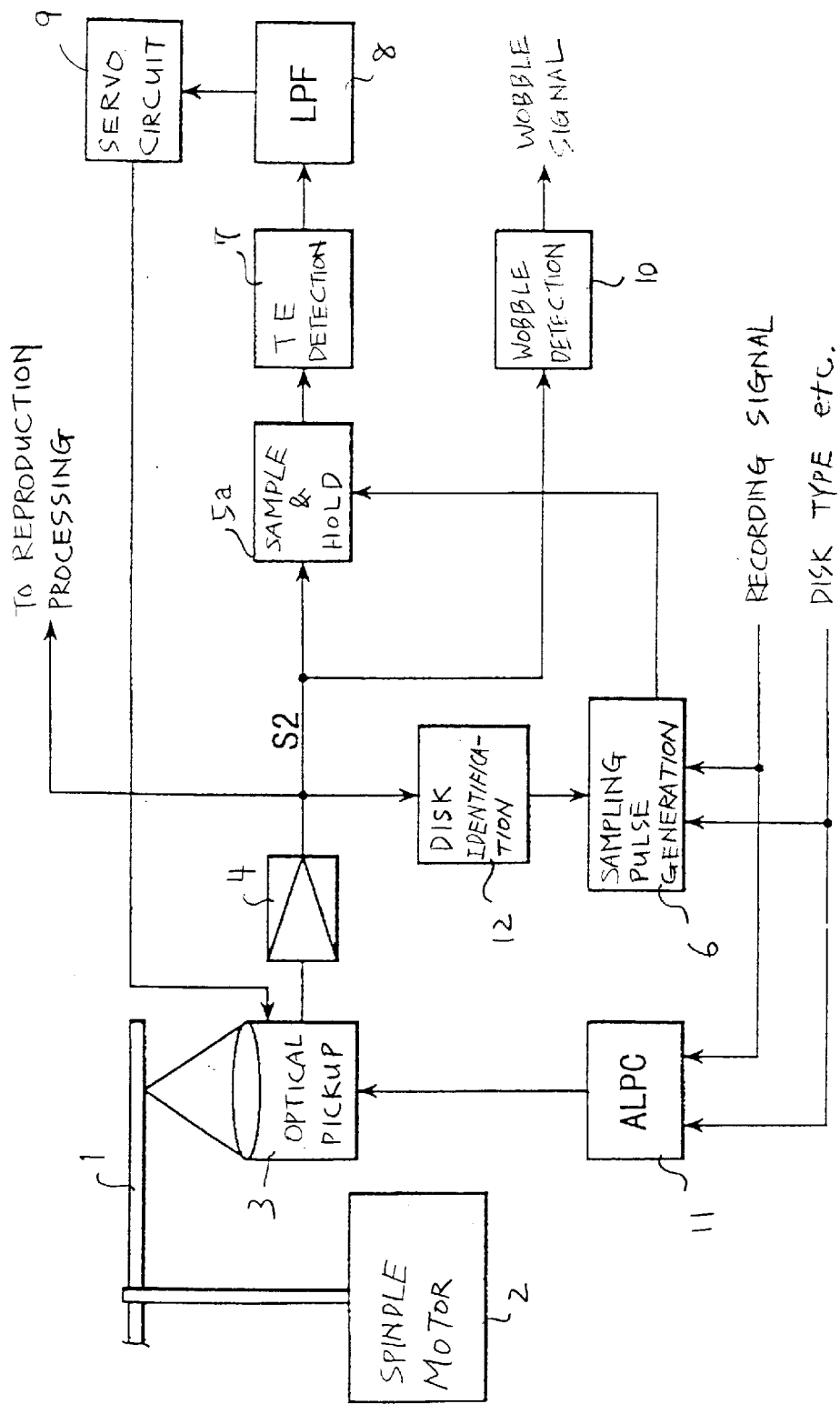
FIG. 6 is a block diagram showing a general organization of an optical disk recording device in accordance with a second preferred embodiment of the present invention.
Figure 8:
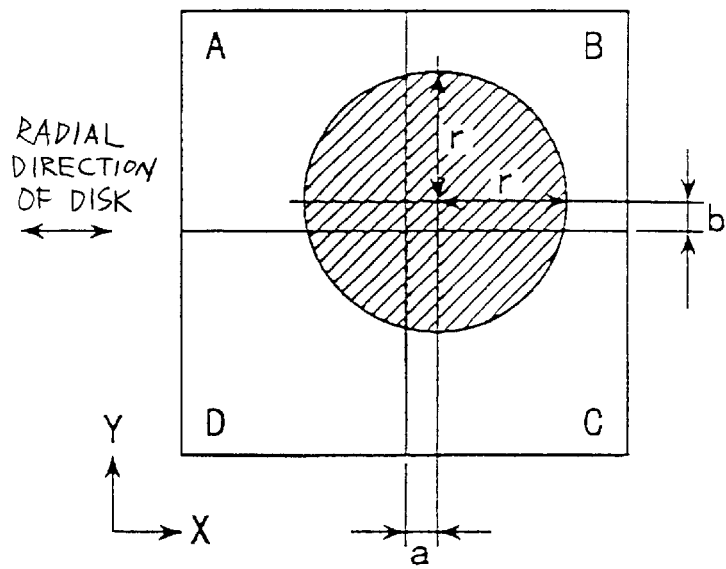
FIG. 8 is a diagram explanatory of optical axis deviations in a conventionally-known optical disk recording device.

The present invention should not be construed as limited to the above-described embodiment alone, and various modifications of the invention are possible as follows. Namely, whereas the first preferred embodiment has been described above as using two different sampling pulses S3a and S3b for the servo control and wobble detection, the reflected light detection signal S2 may be passed directly to the wobble detection circuit 10, as a so-called "through" or non-sampled reflected light detection signal S2, to be used for the wobble detection as shown in FIG. 6. The optical disk recording device in accordance with a second preferred embodiment shown in FIG. 6 is different from the first embodiment of FIG. 1 in that the sampling pulse generator circuit 6 generates only one sort of sampling pulse S3a and the reflected light detection signal S2 is fed directly to the wobble detection circuit 10 without being sampled and held. Such arrangements of FIG. 6 too permit high-accuracy tracking servo control while still maintaining a high C/N ratio of the wobble signal.

Figure 9:
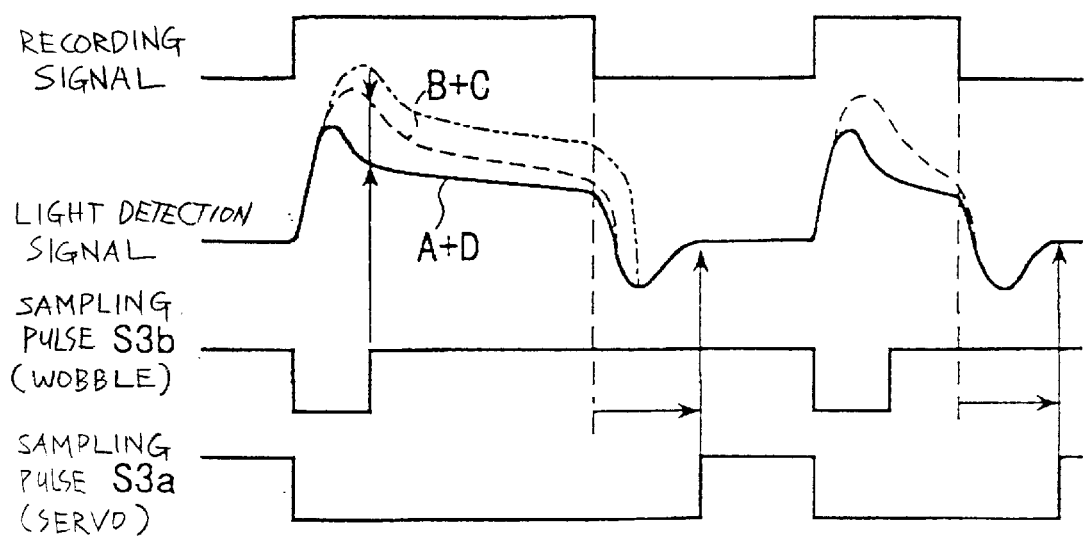
FIG. 9 is a waveform diagram showing a modification of the sampling pulses generated in the optical disk recording device of the present invention.

Further, because adverse influences of the optical axis offset become greater as the recording speed increases as denoted by phantom line in FIG. 9, it is desirable in that the sampling pulse S3a for the tracking servo control be further delayed behind the start of the recording.

In summary, the present invention is characterized primarily in that the sampling pulse for wobble detection, whose sample-and-hold period is longer than that of the sampling pulse for tracking servo control, is generated separately from the sampling pulse for tracking servo control, or the wobble signal is detected from the "through" or non-sampled reflected light detection. With such characteristic arrangements, the present invention affords the superior benefit that the sample-and-hold operation for the tracking servo control is effectively prevented from adversely influencing the wobble signal detection.

What is claimed is:

1. A method of recording an optical disk having a wobbled track, comprising:

projecting a recording light beam onto the wobbled track of the optical disk to form pits of predetermined lengths in the wobbled track of the optical disk;

receiving reflected light of the recording light beam from pit-formed and non-pit-formed portions of the wobbled track of the optical disk, during recording, by a photodetector having a plurality of light receiving surfaces segmented in a radial direction of the optical disk, to output a composite reflected light detection signal;

sampling and holding the reflected light detection signal; and performing tracking servo control based on a light amount distribution, in the radial direction of the optical disk, of the reflected light detection signal sampled and held by said sampling and holding, and detecting a wobble signal of the wobbled track based on a light amount distribution in the radial direction of the optical disk of the reflected light detection signal, wherein timing for said sampling and holding to sample and hold the reflected light detection signal for the tracking servo control is delayed behind timing for said sampling and holding to sample and hold the reflected light detection signal for detection of the wobble signal, wherein a sample-and-hold time period of the reflected light detection signal for the tracking servo control is set to be shorter than a sample time period of the reflected light detection signal for detection of the wobble signal of the wobbled track, and wherein lengths, along a longitudinal direction of a track, of the pits formed in the wobbled track of the optical disk are set to be within a 3T–11T range and wherein a delay time of the timing to sample and hold the reflected light detection signal for the tracking servo control is set to be within a 4T–5T range and a delay time of the timing to sample the reflected light detection signal for detection of the wobble signal of the wobbled track is set to be within a 0–2T range.

2. A method of recording an optical disk having a wobbling track, comprising projecting a recording light beam onto the wobbling track of the optical disk to form pits of predetermined lengths in the wobbling track of the optical disk;

outputting a reflected light detection signal by a photodetector having a plurality of light receiving surfaces segmented in a radial direction of the optical disk while receiving a reflected light of the recording light beam reflected from pit-formed and non-pit-formed portions of the wobbling track of the optical disk by the photodetector, generating a first sampling pulse and a second sampling pulse;

sampling and holding the reflected light detection signal for a time period of the first sampling pulse;

performing tracking servo control based on a light amount distribution, in the radial direction of the optical disk, of the reflected light detection signal sampled and held by said step of sampling and holding; and detecting a wobble signal of the wobbling track based on a light amount distribution, in the radial direction of the optical disk, of the reflected light detection signal for a time period of the second sampling pulse, wherein the time period of the second sampling pulse of said step of detecting the wobble signal of the wobbling track is set to be longer than the time period of the first sampling pulse of said step of sampling and holding the reflected light detection signal.

3. A device for recording an optical disk having a wobbling track, comprising:

an optical pickup that projects a recording light beam onto the optical disk to form pits of predetermined lengths, receives a reflected light of the recording light beam from the optical disk by a photodetector having a plurality of light receiving surfaces segmented in a radial direction of the optical disk, and outputs a reflected light detection signal;

a sampling pulse generator circuit that generates a first sampling pulse and a second sampling pulse;

a first sampling-and-hold circuit that samples and holds the reflected light detection signal output from said optical pickup during a time period of the first sampling pulse;

a second sample-and-hold circuit that samples the reflected light detection signal output from said optical pickup during a time period of the second sampling pulse;

a tracking error detection circuit that generates a tracking error signal based on a light amount distribution, in the radial direction of the optical disk, of the reflected light detection signal sampled and held by said first sample-and-hold circuit;

a servo control circuit that performs tracking servo control on said optical pickup in accordance with the tracking error signal generated by said tracking error detection circuit; and a wobble signal detection circuit that detects a wobble signal of the wobbling track based on a light amount distribution, in the radial direction of the optical disk, of the reflected light detection signal sampled by said second sample-and-hold circuit;

wherein the time period of the second sampling pulse is set to be longer than the time period of the first sampling pulse.

4. A method of recording an optical disk having a wobbling track, comprising:

projecting a recording light beam onto the wobbling track of the optical disk to form pits of predetermined lengths in the wobbling track of the optical disk;

outputting a reflected light detection signal by a photodetector having a plurality of light receiving surfaces segmented in a radial direction of the optical disk while receiving reflected light of the recording light beam reflected from pit-formed and non-pit-formed portions of the wobbling track of the optical disk;

generating a first sampling pulse and a second sampling pulse;

sampling and holding the reflected light detection signal for a time period of the first sampling pulse;

performing tracking servo control based on a light amount distribution, in the radial direction of the optical disk, of the reflected light detection signal sampled and held by said step of sampling and holding;

detecting a wobble signal of the wobbling track based on a light amount distribution, in the radial direction of the optical disk, of the reflected light detection signal for a time period of the second sampling pulse, wherein the time period of the second sampling pulse of said step of detecting the wobble signal of the wobbling track is set to be longer than the time period of the first sampling pulse of said step of sampling and holding the reflected light detection signal, and wherein the predetermined lengths, along a longitudinal direction of a track, of the pits formed in the wobbling track of the optical disk are set to be within a 3T–11T range and wherein the first and second sampling pulses generated by said step of generating are generated by delaying start timings of the first and second sampling pulses for a delay time within a 4T–5T range for the first sampling pulse and for a delay time within a 0–2T range for the second sampling pulse from a start timing of a recording pulse.

* * * * *